United States Patent [19]

Rohrbach

[11] 4,198,201

[45] Apr. 15, 1980

[54] METHOD OF AND APPARATUS FOR OPERATING INDUSTRIAL FURNACE SYSTEMS

[75] Inventor: Hans-Jörg Rohrbach, Balingen, Fed. Rep. of Germany

[73] Assignee: Rohrbach Technologie, Kommanditgesellschaft Baustofftechnik GmbH & Co., Fed. Rep. of Germany

[21] Appl. No.: 911,952

[22] Filed: Jun. 2, 1978

[30] Foreign Application Priority Data

Jun. 10, 1977 [DE] Fed. Rep. of Germany ........ 2726157

[51] Int. Cl.² ............................................. F27B 15/00
[52] U.S. Cl. ..................................... 432/13; 110/245; 110/263; 159/DIG. 3; 159/47 R; 432/14; 432/106
[58] Field of Search ................... 432/14, 106, 13, 15; 110/245, 263; 159/47 R, DIG. 3

[56] References Cited

U.S. PATENT DOCUMENTS

| | | | |
|---|---|---|---|
| 3,489,527 | 1/1970 | Cates, Jr. et al. | 432/106 X |
| 3,776,688 | 12/1973 | Damgaard-Iversen et al. | 432/14 |

*Primary Examiner*—John J. Camby
*Attorney, Agent, or Firm*—Lawrence E. Laubscher

[57] ABSTRACT

A method and apparatus for operating an industrial furnace system for treating materials is disclosed, characterized in that the heat which is applied to the material to be treated is partially derived from the combustion of a mixture of waste fuel and water such as sewage slurry. Waste heat generated at the outer surface of the furnace and waste heat generated from the cooling of the treated material is further applied to the slurry to partially dry the waste fuel prior to and during the combustion thereof.

16 Claims, 2 Drawing Figures

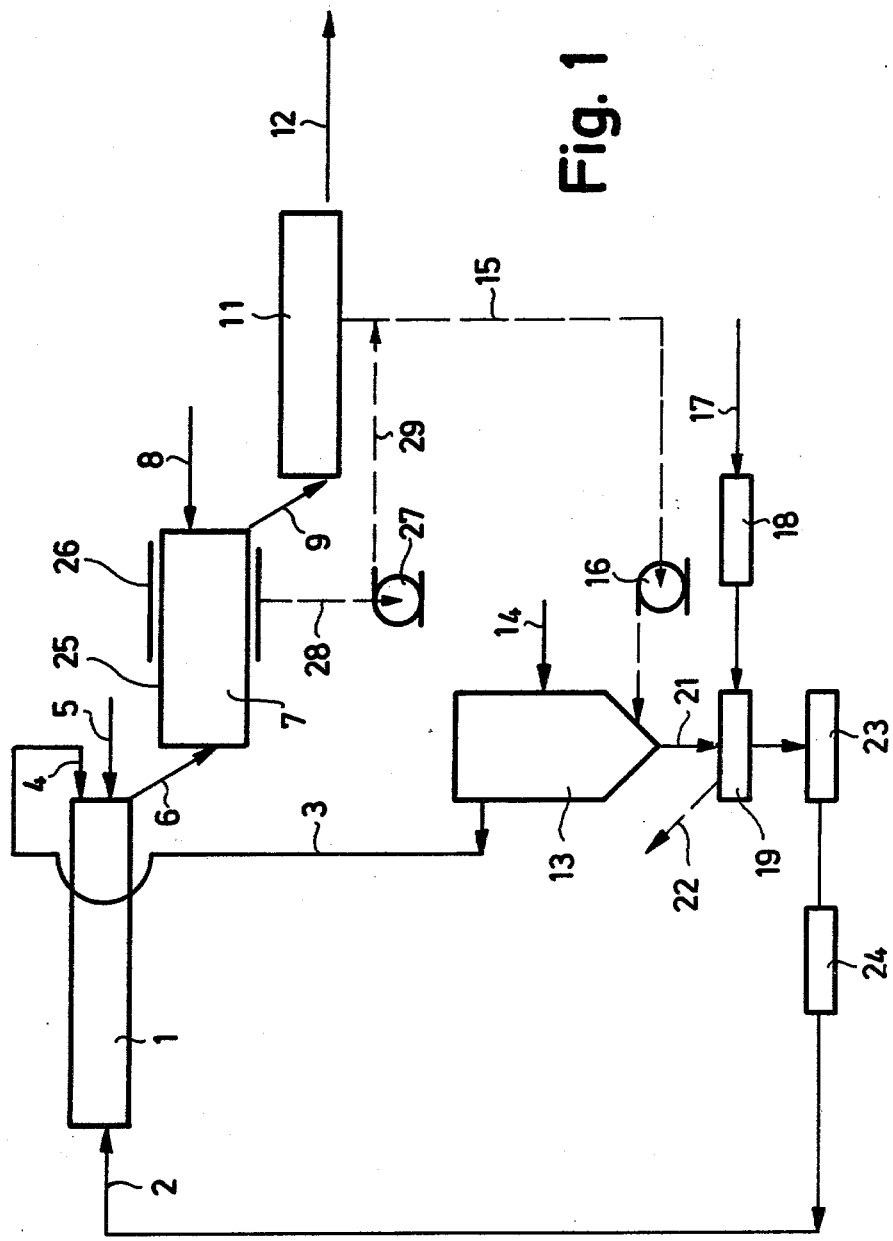

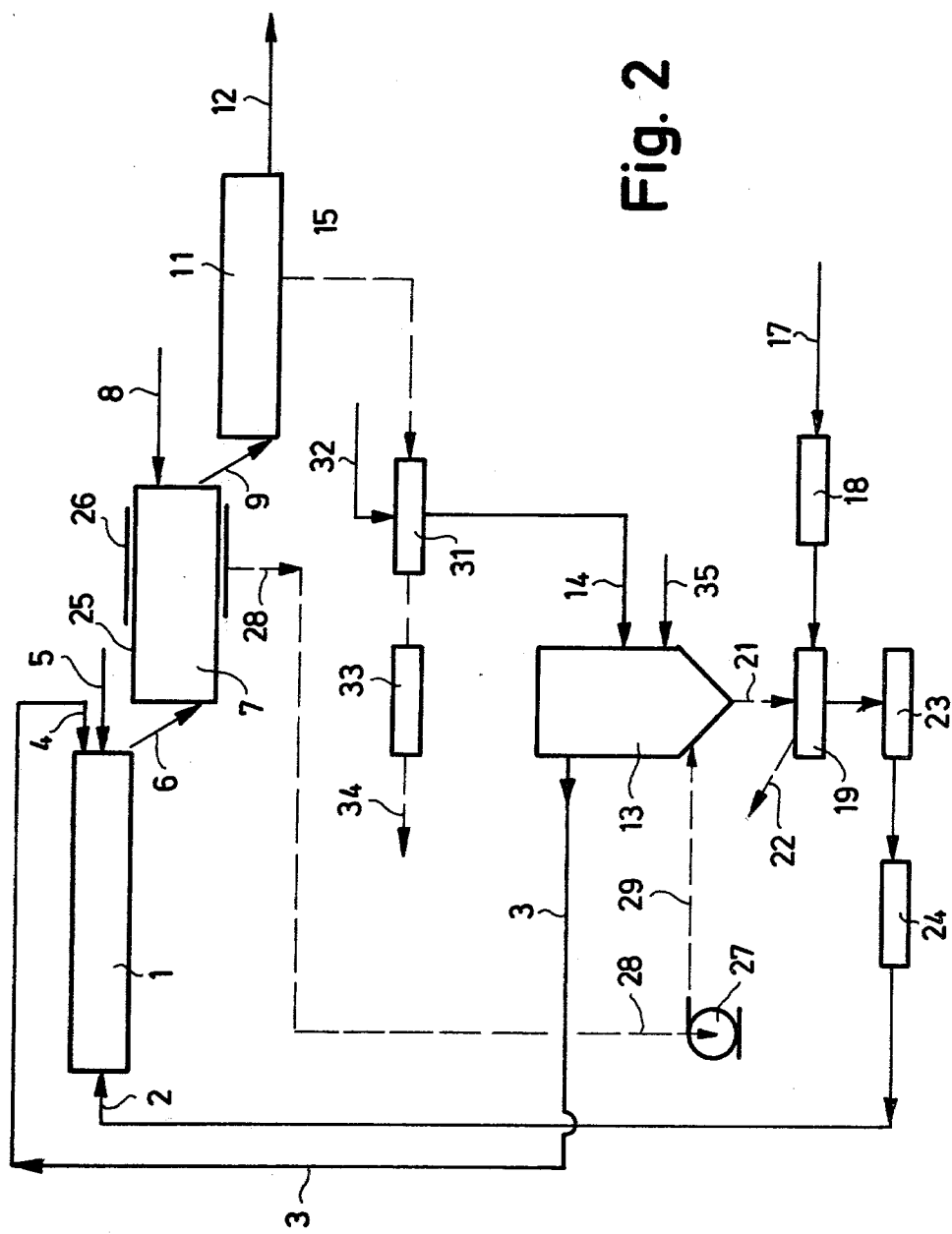

METHOD OF AND APPARATUS FOR OPERATING INDUSTRIAL FURNACE SYSTEMS

BACKGROUND OF THE INVENTION

The invention relates to a method and apparatus for operating an industrial furnace system wherein heat obtained from burning a fuel is supplied to a material to be treated and waste heat is generated.

It is known that numerous industrial processes are carried out in industrial furnace systems by supplying heat energy. For example, in the manufacture of expanded clay, cement, lime, fertilizers or the like, a certain raw material must be subjected to heat treatment in rotary kilns. Fired vertical kilns for calcining and roastings, oxidizing or sintering ores, and also sintering belts or fluidized bed furnaces are likewise known.

What all these processes have in common is that they have relatively high heat requirements which to date have been met by using high quality fuels, for example, oil, gas, coal or coke. In view of the scarcity of most of these fuels, the financial expenditure for the heat requirements in these industrial furnace systems is very high.

Relatively high amounts of waste heat are produced during operation of many industrial furnace systems, for example, by combustion machine surface radiation or through cooling devices used in the system which require large amounts of air to cool a treated material relatively quickly so that it can be further processed. The waste heat generated is in the form of hot air whose temperature (for example, between approximately 200° and 400° C.) is not high enough to make reuse in the same system appear worthwhile.

It is also known that the utilization of waste coming from municipal waste disposal installations, for example, sewage slurry, is problematic owing to high water content. Such waste, including, for example, sewage slurry with a relatively low moisture content, has been burnt in a fluidized bed furnace, and the combustion gases used for operating a compressor-turbine-unit (German published patent application No. 1943776). However, the problem of reusing the waste heat of the cooling device of an industrial furnace system did not occur, and with the exception of the relatively robust shovels of the turbine, the combustion gases from the fluidized bed furnace did not come into contact with any other material to be treated, as is the case in industrial furnace systems.

In effect, the combustion heat of the combustible substance contained in sewage slurry is relatively high, for example, approximately 8,000 kcal/kg of pure fuel. The combustion heat is only reduced by the high ash and water content in the sewage slurry. In the dry state the combustion heat of this material is still approximately 4,000 kcal/kg (approximately 50% to 60% of the combustion heat of a good sort of coal). It is only by the high water content of the sewage slurry which even after filtration lies between approximately 40% and 70%, more particularly, between approximately 50% and 60% water, that is usability is practically destroyed. For if filtered sewage slurry with 4,000 kcal/kg of combustion heat contains 70% water in the dry substance, the combustion heat drops to 30% owing to this circumstance alone for 1 kilogram of "fuel" contains only approximately 0.3 kilograms of combustible substance. Furthermore, the water must be evaporated during combustion, and in the event that water vapor is to be the evaporation product, a further 406 kcal/kg, based on the fuel used, are required. Consequently, a combustion heat of 794 kcal/kg is what remains in the end for the sewage slurry. However, since most thermal processes require high flame temperatures in order to attain the process temperatures and perform the processes in a short time, and furthermore, since the flame temperatures are a function of combustion heat and excess air, the aforesaid waste fuels have to date been unable to be used in practically all industrial furnace systems.

SUMMARY OF THE INVENTION

The primary object of the invention is to provide methods of and apparatuses for operating industrial furnace installations wherein waste fuels such as sewage slurry may be employed in such a manner that sufficiently high flame temperatures are obtained. A further object is to avoid emission of harmful materials.

The object is attained with the inventive method in an industrial furnace installation by using water containing waste fuels, more particularly, sewage slurry, as fuel, and subjecting these waste fuels to the waste heat generated in the furnace system during or prior to their combustion in order to dry them.

An apparatus for performing this method comprises a drying device for waste fuels, more particularly, sewage slurry. The drying device is connected to a cooling device of the industrial furnace system by a pipe through which the waste heat of the cooling device travels to the drying device.

BRIEF DESCRIPTION OF THE FIGURES

The following description of preferred embodiments of the invention serves in conjunction with the attached drawings to explain the invention in which:

FIG. 1 is a block diagram illustrating a first embodiment of the invention; and

FIG. 2 is a block diagram of a second embodiment of the invention.

DETAILED DESCRIPTION

The firing method functioning according to the diagram in FIG. 1 and a suitable apparatus for performing the method are primarily destined for processing a sewage slurry with relatively low water content, for example, 50%. Sewage slurry with such a water content can be obtained with the help of filter presses.

The lay-out in FIG. 1 is based on a system known per se for the production of expanded clay. This installation consists of a preheater 1, into which the raw clay material to be treated is continuously introduced, as indicated by arrow 2. The preheater 1 is preferably designed as a rotary kiln. Combustion gas or hot combustion air is introduced at the side of the preheater 1 that is opposite the arrow 2, through a pipe 3, as indicated by arrow 4. As indicated by arrow 5, a high quality fuel, for example, oil, can, if necessary, be mixed with the gas introduced through the pipe 3 to bring about a corresponding increase in the temperature. The preheated clay comes (see arrow 6) into the actual expanding kiln 7, which is heated to a relatively high temperature by fuel introduced in the direction of the arrow 8. The expanding kiln 7 is also a rotary kiln. As indicated by arrow 9, the very hot expanded clay comes into a cooler 11 where it is cooled by cooling air in a manner known per se to a temperature which is suitable for further processing. The finished expanded clay leaves the cooler 11 in the direction of the arrow 12.

A conventional fluidized bed reactor 13 is supplied with sewage slurry having a 50% water content (see arrow 14). Instead of cold air, the reactor 13 is run by the cooling air which has been removed from the cooler 11 through a pipe 15 and a blower 16, which has now been heated by the waste heat of the expanded clay and acts as combustion air. The hot gas or combustion gas produced in a known manner in the reactor 13 comes through pipe 3 to the burner (not illustrated) of the preheater 1. In this way, the waste heat from the cooler 11 is exploited during combustion of the sewage slurry in the fluidized bed reactor, and the relatively high water content of this sewage slurry is thereby compensated for.

The raw clay material to be processed is introduced into a mixer 19 via a clay rasping device 18 (see arrow 17). The hot residues (ash) from the fluidized bed reactor are added to the raw material in the mixer (see arrow 21). Arrow 22 indicates the escaping moisture. Subsequently, the material is ground in a station 23 and granulated in a further station 24. In this granulated form it is finally introduced into the preheater 1, as indicated by arrow 2.

The mode of operation according to FIG. 1 has the advantage that the malodorous vapors occurring during the drying of the sewage slurry (in the fluidized bed reactor 13) also travel together with the hot gases to the burner of the preheater 1, where they lose all odorous substances by the high combustion temperature and can be released into the environment in an unharmful form. Furthermore, this type of method enables the water contained in the sewage slurry to be used advantageously for generating water gas in the fluidized bed reactor.

The method diagrammatically presented in FIG. 1 also enables the waste heat occurring on the outer wall 25 of the expanding kiln 7 to be exploited. For this purpose, the hot zone of the kiln 7 is enclosed by a double or outer casing 26. The heated air is led from the space between the outer casing 26 and the outer wall 25 of the expanding kiln 7 through a blower 27 and pipes 28, 29 to the pipe 15 directing the warm cooling air from the cooler 11 for further utilization. The expanding zone of the kiln is thereby intensively cooled and the danger of the granulated clay material becoming caked upon or stuck to the kiln reduced. For economic reasons, a special cooling device for the expanding kiln has hitherto not been provided. Only if sewage slurry is burnt and dried by the hot air drawn from the outer wall of the kiln 7 is such cooling worthwhile. In order to increase the heat transfer the outer wall 25 of the expanding kiln 7 can be provided in a conventional manner with cooling ribs.

FIG. 2 is a diagram of a modified embodiment of the invention. Corresponding parts in FIGS. 1 and 2 have the same reference numerals and operate in the above-described manner. These need not be described again. The principal difference between the techniques according to FIGS. 1 and 2 is that in FIG. 2 the sewage slurry introduced into the fluidized bed reactor 13 (see arrow 14) is cooled beforehand in a drier 31, such as a conventional rotary drier, with the help of the hot exhaust air supplied from the cooler 11 through the pipe 15. The sewage slurry which can have a water content of, for example, 70% is introduced into the drier 31 as indicated by arrow 32. In other words: If a relatively dry sewage slurry with, for example, 50% moisture content is provided, it can be introduced directly as shown in FIG. 1 (arrow 14) into the fluidized bed reactor 13; on the other hand, if a damp sewage slurry with, for example, 70% water content is available, it is best to dry it beforehand in a special drier 31 (see FIG. 2).

The drier 31 is connected to a dust removing device 33 from which the now cold, dedusted air and the malodorous vapors from the sewage slurry escape into the environment (arrow 34).

Normally, part of the hot cooling air produced in the cooler 11 is added to the principal firing of the expanding kiln 7 as secondary combustion air. However, since, above all, in methods with low total heat consumption expanded clay requires a greater amount of air for its cooling down than is required for firing the kiln installation, there is a sufficiently large amount of heated air available to dry the sewage slurry in the drier 31. While the very hot air supplied to the expanding kiln 7 is removed at the side of the cooler 11 facing this kiln, the cooler air required for the sewage slurry drying process is best removed at the opposite end of the cooler 11 which is usually designed as a cooling drum through a pipe extending approximately as far as the center of the cooler, and directed through the pipe 15 into the drier 31. The cooling air can also be removed at the circumference of the cooling drum, for example, with the help of a double or outer casing (see outer casing 26 of the expanding kiln 7).

The fluidized bed reactor 13 is supplied with the required combustion air via the blower 27 and the pipe 29. This combustion air can be removed as preheated air from the space between the outer casing 26 and the outer wall 25 of the expanding kiln 7 through the pipe 28. Alternatively, this hot air could also be transferred through the pipe 28 into the pipe 15 and subsequently used to dry the sewage slurry in the drier 31. If water gas is to be generated in the fluidized bed reactor 13, the water required therefor can advantageously be introduced in the form of water remaining in the sewage slurry. Alternately, water can also be supplied by a pipe 35 and introduced through nozzles, so that depending on the desired composition of the gas in the reactor 13, carbon oxide or water gas can be produced.

The gases arrive in the preheater 1 through the pipe 3.

The above-described methods have the advantage that the sulphur contained in the gases coming from the fluidized bed reactor 13 (sulphur dioxide or hydrogen sulphide) is bonded with the raw material to be treated in the preheater 1, and consequently does not cause environmental pollution. The sulphur can be bonded in this way, particularly in the manufacture of cement, because sufficient lime is available. Furthermore, a sulphur bond also already takes place in the fluidized bed reactor 13 where the sulphur combines with the ash exiting through the pipe 21. In this case, the fluidized bed reactor can be operated with an artificial fludized bed consisting of limestone, and during the combustion or gasification procedure, the sulphur in the sewage slurry is bonded with the lime in the form of calcium sulphate or calcium sulphite. This procedure is particularly recommendable in the manufacture of expanded clay, as the raw material to be treated in this case usually contains relatively little lime.

In the above-described embodiments of the invention the hot waste gas from the fluidized bed reactor 13 is supplied to the preheater 1 through the pipe 3. In a modified embodiment one could analogously also connect the pipe 3 to the expanding kiln 7 and thus exploit the heat value of the sewage slurry in this kiln. Furthermore, both the preheater 1 and the expanding kiln 7 can be connected to the pipe 3 or two separate fluidized bed reactors 13 can be used, one of which is associated with the preheater and the other with the expanding kiln 7. If the gases gained in the fluidized bed reactor 13 are not sufficient to heat the raw material in the preheater 1 or the expanding kiln 7 to the desired temperatures, additional fuel (coal, oil, gas) can be supplied and burned as shown by arrows 5 and 8 in FIGS. 1 and 2.

If the inventive method is employed for the manufacture of expanded clay, in accordance with the ash composition, there arises the further advantage that the fine grained ash discharged from the fluidized bed reactor can be combined with the expanded clay granules and thus harmlessly removed.

In the hitherto described techniques the combustion gases or gasification components obtained from the fluidized bed reactor 13 are used directly for firing the preheater 1 (or the expanding kiln 7). In a modified embodiment of the invention the hot gases obtained from the fluidized bed reactor 13 can also give their heat to the material to be treated indirectly in a heat exchanger. In this case, any harmful components contained in these gases, such as sulphur compounds and ashes, cannot be absorbed by the material to be treated.

In the following the principal features and advantages of the invention are once again summarized: The gist of the invention consists in that waste fuels, more particularly, sewage slurry having a high water content (up to more than 70%), are dried prior to or during their employment by waste heat obtained from those processes for whose performance they are to be used.

The drying can be effected either in drum driers, vertical driers, fluidized bed driers or other drying means, depending on the granularity of the waste fuels. If they are fine enough after the drying procedure the waste fuels can then be burnt, for example, in conventional pulverized coal burners using various heat treatment processes. If the waste fuels are not fine enough they can be reground and burnt in the same apparatus. A further advantageous way of effecting combustion consists in gasifying or burning the waste fuel, more particularly, sewage slurry, in a fluidized bed installation in the suspended state. Either air (carbon oxide is produced) or water vapor (water gas is produced) or a mixture of both can be used for gasification. The gas produced can be directly supplied to a gas burner for combustion.

It is also conceivable to burn the entire waste fuel in the fluidized bed and use the fluidized bed as a burner. However, it must be noted that temperatures higher than those corresponding approximately to the melting points of the ashes obtained from combustion of the fuels may not be used in fluidized beds. The temperature during combustion in the fluidized bed can be decreased by excess air. However, heat is lost or the required process temperatures may not be attained in the combustion furnace upon application of the heat in the respective heat treatment process. For this reason, gasification of the fuel in the fluidized bed is more economical at temperatures between approximately 900° C. and 1,000° C. The gases produced can then be burnt later without any losses together with air in the combustion kiln of the heat treatment process.

The method according to the invention is especially advantageous if the available warm or hot air is present with respect to its temperature and the water content in the waste fuel is approximately the same amount as must be used for combustion of the fuel. For, in this case, the gases derived from the drying process can be directly conducted to a fluidized bed furnace as combustion air.

Furthermore, if the water vapor produced during the drying process leaves either the drier or the process kiln at a temperature of slightly more than 100° C., the amount of heat lost thereby is not greater if the water vapor is contained in the drying air than if it is in the combustion air. This method has further advantages: In the combustion process a large amount of water vapor is present. It is known that large amounts of water vapor in the combustion gases substantially further the heat transfer from these combustion gases to the material to be treated. In addition, the odorous substances occurring during the drying process can be burnt at a high temperature and destroyed harmlessly during combustion of the fuel, so that no malodors occur in the waste gases.

A further advantage of combustion or gasification of waste fuels, more particularly, sewage slurry, in the fluidized bed is that the combustion or gasification can be effected in an artificial fluidized bed, for example, of limestone or dolomite, which is added to stabilize the fluidized bed. During combustion or gasification in such a fluidized bed at temperatures around the deacidifying point of the carbonates used, the often substantial amounts of sulphur contained in the waste fuels are bonded to the lime in the artifical fluidized bed and therefore do not escape into the environment as harmful emissions.

In cases where in the heat treatment process on which the invention is based, calcium carbonate is treated anyhow, and the treatment is carried out in the temperature range in the proximity of the deacidifying point of the calcium carbonate, there is, of course, no need to use calcium carbonate in the fluidized bed, as the sulphur containing gases then donate their sulphur in the thermal process to the calcium carbonate in the material to be treated.

As far as the ash contained in the wastes is concerned, this can, provided it can be taken up by the materials treated in the thermal process, be made harmless by reacting with the material which is subject to heat treatment.

If, on the other hand, the ash is not to be mixed with the material to be treated, it must, if, for example, the gasification or the combustion of the waste fuel takes place in a fluidized bed, be removed from the combustion or gasification chamber of the reactor through an outlet together with the components of the artifical fluidized bed, and separated from the particles of the fluidized bed. Finer components which are not to mix with the material to be treated, must be separated by suitable methods such as cyclone separation as they are carried out of the fluidized bed reactor with the gases generated. There are cases where the heat value or amount of the waste fuels thus employed are not sufficient for the intended heat treatment process. In such a case, they are advantageously used together with another high quality fuel by employing, for example, twin burners for fluid and gaseous, or fluid and solid, or solid and gaseous fuels.

In cases where neither the gases nor the ashes of the gasified or combusted waste fuels are allowed to come into contact with the material to be treated, indirect heat treatment methods with the help of heat exchangers can be used. For example, in rotary drums, the hot combustion gases can be conducted through pipes at whose outer surface the material used is heated by heat transfer.

It is possible to later separate the dust particles from the combustion gases by electrical precipitators as they are cooled during the process to such temperatures as enable electrical precipitators to be employed effectively.

The harmful gases contained in the combustion gases, for example, sulphur dioxide, must be separated by known methods, after the gases have been treated, preferably in the electrical precipitator.

Gasification of a sewage slurry in the fluidized bed offers the further great advantage that poisonous nitrogen compounds ($NO_x$) can hardly be formed by the relatively low temperature (900° C. to 1,000° C.) to be maintained during this process, which eliminates the problem of having to remove these gases from the combustion gases.

A further advantage of the inventive method consists in that when the initial material for the heat treatment process—for example, clay in the manufacture of expanded clay, limestone in the manufacture of cement—must be dried, the ashes produced in the fluidized bed can be used therefor. The ashes leave the fluidized bed at the same temperature as the gases (900° C. to 1,000° C.) and can be mixed with the materials to be dried, in which case they donate their heat to these materials and make the water contained in these materials evaporate.

In most cases, the grain size of the fluidized bed residue and that of the material to be used for heat treatment differ from each other, and so the fluidized bed waste (ashes) can be separated from the material to be treated (ashes) after the drying process by a screening or other sizing apparatus.

The inventive method can also be applied in the following particularly advantageous way: When coal (mineral coal) is separated from the accompanying rocky matter (gangue) in coal pits, so-called wastes in the form of colliery wastes and flotation tailings are obtained. These wastes are clay containing granular material, and the flotation tailings contain remainders of coal, which enables them to form the basis of the inventive method as waste fuel. It is particularly advantageous to use the heat gained from the flotation tailings in the inventive method to subject the colliery wastes (occurring in a greater amount than the flotation tailings) to heat treatment in an industrial furnace (rotary kiln), during which the colliery waste material is ceramized. Since the flotation tailings have a relatively high moisture content, the waste heat obtained from subjecting the colliery wastes to heat treatment can be used to predry the flotation tailings. In this way, a closed process is obtained wherein two different kinds of waste material, both occurring during the acquisition of coal, can be used.

Burnt colliery wastes and burnt flotation tailings (for example, in a fluidized bed furnace) are latent hydraulic pozzolanas and are therefore suitable for the production of so-called mixing binders or pozzolana cements. Pozzolanas in mixing binders require lime hydrate to stimulate the hydraulic characteristics. It was discovered that with the inventive embodiment in question (use of wastes) lime hydrate also occurrs and can be supplied to the end product.

More specifically, the above-described embodiment of the invention consists in heating an industrial furnace installation, e.g., a rotary kiln, to burn colliery wastes in a fluidized bed furnace to form pozzolanas, said fluidized bed furnace being fired by flotation tailings, which prior to being introduced into the fluidized bed furnace are dried by the waste heat from the burnt colliery wastes. The additionally available heat in the fluidized bed furnace is used to deacidify small-sized limestone in the fluidized bed. This small-sized limestone simultaneously serves as a so-called "support bed". The abraded portion of the burnt lime in the fluidized bed serves to bind sulphur with the exhaust gases. If this abraded material is not sufficient, additional limestone meal is supplied to the fluidized bed.

It was found that owing to its small grain size, the ash from the flotation tailings burnt in the fluidized bed furnace can be carried together with the sulphur containing lime ($CaSO_4$) with the hot gas flow leaving the fluidized bed furnace through the rotary kiln, the colliery wastes being subjected to heat treatment (ceramization) in the form of this hot gas flow. This ash is subsequently separated off in an electrical precipitator. The dust from the burnt flotation tailings and the sulphur containing lime separated off in the precipitator can be added to the burnt colliery wastes until the highest permissible $SO_3$ limit is attained. The burnt flotation tailings, the sulphur containing lime and the burnt colliery wastes are ground together to the desired grain size.

Preferably before being mixed with the burnt colliery wastes (and the burnt flotation tailings from the electrical precipitator), the small-sized burnt lime removed separately from the fluidized bed furnace is hydratized in a separate system where water is added and lime hydrate obtained. After the grinding process, a mixing binder is obtained whose components can be tuned to one another quantitatively so as to arrive at the desired end product.

The last above-described preferred embodiment of the invention is particularly interesting because for the first time use of a waste fuel (flotation tailings) in an installation enables simultaneous production of all components required for a mixing binder, which, moreover, are formed for the greater part from waste materials (colliery wastes).

Burnt (ceramized) colliery wastes can also be used as additions in road building as an anti-skid medium in the uppermost of the layers of tar.

In the last above-described method the waste heat for predrying the flotation tailings is obtained, for example, from a cooling device which the ceramized colliery wastes pass through after leaving a rotary kiln. A fluidized bed furnace wherein the colliery wastes which are preheated in a preheater can be burned, can also be used as an "industrial furnace installation" for the ceramization of the colliery wastes. In this case, the gas flow leaving the fluidized bed serves to perform the preheating. In this embodiment of the inventive method the predried flotation tailings (as fuel) are introduced into the fluidized bed furnace at the same time as the colliery wastes. A mixture of burnt colliery wastes and flotation tailings which are cooled in a cooling device are removed from the fluidized bed furnace. The waste heat obtained thereby is used to predry the flotation tailings. Dust-like flotation tailings occurring in the preheater or drying device can be separated off in filters and reintroduced into the method cycle.

In yet another different embodiment of the inventive method—see FIG. 2—moist waste fuel, more particularly, sewage slurry, can be completely dried in the drying device 31 and subsequently used directly as fuel in the preheater 1 or the furnace 7 (rotary kiln). To present this diagrammatically, arrow 14 in FIG. 2 would have to be connected to arrow 5 and/or arrow 8. In this case too, the effect of this fuel can, if necessary, be furthered by "supportive firing" with oil, gas or coal.

Finally, when performing the inventive method, it can also be advantageous to conduct the malodorous vapors escaping in the direction of arrow 34 in FIG. 2 together with air through the cooler 11, the furnace 7 and/or the preheater 1 in the opposite direction of the arrow 12, and thereby render any odorous substances contained in the malodorous vapors harmless.

What I claimed is:

1. A method for operating an industrial furnace system including heat treating chamber means for supplying heat to a material to be treated, a fuel supply for supplying fuel to said chamber means, and means for collecting waste heat from said furnace system, comprising the steps of
(a) supplying waste heat from said furnace system to a sewage slurry mixture of water and waste fuels having a water content of between 40% and 80% for combustion of said sewage slurry to produce
  (1) partially dried waste fuels;
  (2) hot waste fuel combustion gases; and
  (3) water vapor;
(b) supplying said partially dried waste fuels to said fuel supply for heat treating the material to be treated in said chamber means; and
(c) supplying said hot waste fuel combustion gases to said heat treating chamber means, whereby waste heat from said furnace system is recycled through combustion of said sewage slurry to produce combustion gases and waste fuels used by said system heat treating chamber means.

2. A method as defined in claim 1, wherein said hot waste fuel combustion gases are supplied to heat exchanger means where heat is extracted from said gases for delivery to said heat treating chamber means.

3. A method as defined in claim 2, wherein said waste heat is supplied to said sewage slurry mixture in a fluidized bed reactor for combustion thereof.

4. A method as defined in claim 3, wherein said fluidized bed reactor includes an artificial fluidized bed of limestone which binds with the sulphur contained in said sewage slurry to produce a hot ash mixture.

5. A method as defined in claim 4, wherein said hot ash mixture is combined with the material to be treated to reduce the moisture content thereof.

6. A method as defined in claim 5, wherein the heat generated from said sewage slurry mixture is used to manufacture expanded clay.

7. A method as defined in claim 6, wherein said sewage slurry mixture comprises flotation tailings and said material to be treated comprises colliery wastes, thereby to produce a ceramic material.

8. A method as defined in claim 7, wherein said hot ash mixture produced from combustion of said floatation tailings and said limestone in said fluidized bed reactor is combined with said colliery wastes to produce a mixing binder.

9. A method for operating an industrial furnace system including heat treating chamber means for supplying heat to a material to be treated, a fuel supply for supplying fuel to said chamber means, and means for collecting waste heat from said furnace system, comprising the steps of
(a) supplying waste heat from said furnace system to a sewage slurry mixture of water and waste fuels for combustion of said sewage slurry; and
(b) supplying said waste fuels to said fuel supply, whereby waste heat from said furnace system is recycled through combustion of said sewage slurry to produce waste fuels used by said system heat treating chamber means.

10. A method as defined in claim 9, wherein said sewage slurry has a water content of between 40% and 80%.

11. A method as defined in claim 10, wherein combustion of said sewage slurry produces partially dried waste fuels and water vapor.

12. A method as defined in claim 11, wherein said sewage slurry is partially dried prior to combustion thereof.

13. An industrial furnace system for treating materials, comprising
(a) heat treating chamber means for treating a material;
(b) means for supplying fuel to said chamber means;
(c) cooling means connected with said heat treating chamber for cooling the material following heat treatment thereof; and
(d) means connected with said cooling means for supplying waste heat generated from said cooling means to said fuel supply means;
(e) said fuel supply means including sewage slurry drier means for partially drying a sewage slurry mixture of water and waste fuels with the waste heat generated from said cooling means, said partially dried waste fuels being supplied to said chamber means, whereby waste heat generated from said furnace system is recycled through said drier means to partially dry waste fuels used by said system heat treating chamber means.

14. Apparatus as defined in claim 13, wherein the outer wall surface of said heat treating chamber means includes a plurality of ribbed projections to increase heat transfer therethrough.

15. Apparatus as defined in claim 14, and further comprising
(f) jacket means extending continuously around and spaced from said heat treating chamber means thereby to define a passage; and
(g) blower means for directing cooling air through said passage, said cooling air being heated by heat exchange from said chamber means; and
(h) means for delivering said heated cooling air to said drier means for partially drying said sewage slurry.

16. Apparatus as defined in claim 15, wherein said fuel supply means further includes fluidized bed reactor means connected with said drier means, and means for delivering a portion of said heated cooling air to said fluidized bed reactor means, whereby said partially dried waste fuels are further treated in said fluidized bed reactor means.

* * * * *